(12) United States Patent
Parrozzani

(10) Patent No.: US 11,613,064 B2
(45) Date of Patent: Mar. 28, 2023

(54) APPARATUS AND PROCESS FOR ASEPTICALLY FORMING CONTAINERS STARTING FROM PARISONS MADE OF A THERMOPLASTIC MATERIAL

(71) Applicant: GEA PROCOMAC S.P.A., Sala Baganza (IT)

(72) Inventor: Marco Parrozzani, Ponzano Veneto (IT)

(73) Assignee: GEA PROCOMAC S.P.A., Sala Baganza (IT)

(*) Notice: Subject to any disclaimer, the term of this patent is extended or adjusted under 35 U.S.C. 154(b) by 119 days.

(21) Appl. No.: 17/213,837

(22) Filed: Mar. 26, 2021

(65) Prior Publication Data

US 2021/0299935 A1    Sep. 30, 2021

(30) Foreign Application Priority Data

Mar. 30, 2020    (IT) .......................... 102020000006583

(51) Int. Cl.
| | |
|---|---|
| *B29C 49/42* | (2006.01) |
| *B29C 49/46* | (2006.01) |
| *B29C 49/12* | (2006.01) |
| *B29C 49/36* | (2006.01) |
| *B29L 31/00* | (2006.01) |

(52) U.S. Cl.
CPC .......... *B29C 49/4284* (2013.01); *B29C 49/12* (2013.01); *B29C 49/36* (2013.01); *B29C 49/42855* (2022.05); *B29C 49/46* (2013.01); *B29C 2049/4635* (2013.01); *B29L 2031/712* (2013.01)

(58) Field of Classification Search
CPC .......... B29C 49/4284; B29C 49/42855; B29C 2049/4635
See application file for complete search history.

(56) References Cited

U.S. PATENT DOCUMENTS

| | | | |
|---|---|---|---|
| 5,648,026 A | * | 7/1997 | Weiss ...................... B29C 49/42 264/529 |
| 2010/0272844 A1 | | 10/2010 | Dordoni |
| 2011/0286899 A1 | | 11/2011 | Martini et al. |
| 2011/0309557 A1 | * | 12/2011 | Martini ............... B29C 49/4252 425/535 |
| 2014/0103584 A1 | | 4/2014 | Pagliarini et al. |

FOREIGN PATENT DOCUMENTS

EP    2246176 A1    11/2010

* cited by examiner

*Primary Examiner* — Robert B Davis
(74) *Attorney, Agent, or Firm* — Pearne & Gordon LLP; Bryan M. Gallo

(57) ABSTRACT

Process for aseptically forming containers (100) starting from parisons made of thermoplastic material, comprising the steps of:
 injecting sterile compressed air inside a parison arranged in a stretch-blowing forming mould (2) so as to obtain a container (100);
 evacuating the exhaust compressed air from the formed container (100);
 making at least a part of the exhaust compressed air evacuated from the formed container (100) passing through a sterile filter (SF) so as to obtain recovery sterile air;
 injecting the recovery sterile air in another parison arranged in another forming mould (2).

14 Claims, 2 Drawing Sheets

Figure 1:
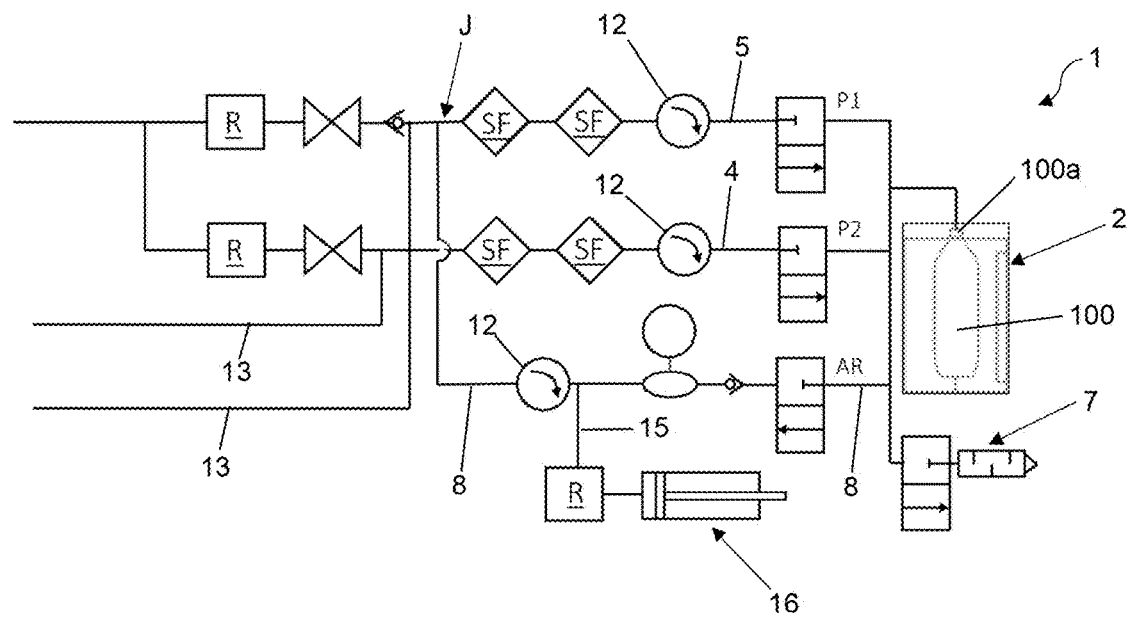

APPARATUS AND PROCESS FOR ASEPTICALLY FORMING CONTAINERS STARTING FROM PARISONS MADE OF A THERMOPLASTIC MATERIAL

The present invention relates to an apparatus and a process for aseptically forming containers starting from parisons made of a thermoplastic material.

The reference sector for the present invention is the bottling of so-called "sensitive" food products, i.e. products that are particularly sensitive to bacteriological contamination and oxidation, such as, for example, isotonic drinks, juices, nectars, soft drinks, tea, milk-based drinks, coffee-based drinks, etc., for which the prevention of possible microbiological contamination throughout all packaging stages is of fundamental importance.

According to the prior art, a stretch-blowing machine comprises a plurality of workstations, each with a forming mould. Aside from design variations, each mould comprises two half-moulds that reproduce the shape of the sides of the container and a lower bottom that reproduces the shape of the base of the container to be obtained.

The parison, previously heated, is introduced in one of the moulds and the mouth is sealed by means of a closing member—the "seal" or blowing nozzle—through which compressed air is blown into the parison itself.

In the initial step of the forming process, the seal sends air into the parison at medium pressure (maximum 15-16 bar) and, simultaneously, a stretching rod is gradually introduced into the parison until it reaches the bottom.

This step is generally defined as "pre-blowing".

After touching the bottom, the stretching rod continues its linear movement so as to stretch the parison until substantially reaching the desired length of the container to be obtained.

Subsequently, the seal blows air at high pressure (about 40 bar) so as to expand the parison until it adheres to the inside walls of the half-moulds and of the bottom. This blowing at high pressure is the actual "blowing" step which follows the "pre-blowing".

Simultaneously, the stretching rod retracts until it exits from the container. At the end of the forming process, the air inside the container is discharged, again through the seal. The seal is then removed from the container.

In the specific area of the aseptic forming of containers, EP2246176 discloses the use of an isolation device that defines a controlled-contamination environment separate from the external environment (dirty). The compressed air used in the blowing passes through one or more sterile filters before entering the isolation device.

Aseptic technology requires a level of blowing air purity greater than that guaranteed by the filters that are normally used on blowers (e.g. coalescing or activated charcoal filters).

In fact, the blowing air that contributes to forming the container, in aseptic technology, comes into contact with an already sterile parison. Such sterility must be maintained throughout the entire blowing process in order to deliver a sterile container to the filler.

For this reason, filters adapted to purify the blowing air must have filtration performance levels such as to guarantee that the blowing air is sterile.

The forming process by stretch-blowing implies a high consumption of air. To face this problem, part of the air used during blowing, commonly defined as exhaust air, is recovered.

In an aseptic forming context, it is known to recover the exhaust blowing air with a dedicated valve and send it to the compressed air line of the factory and/or compression systems external to the process and/or tanks. In other words, in an aseptic context the exhaust air is not recovered within the forming process.

In a non-aseptic forming context, there are known solutions that recover exhaust (non-sterile) air also within the forming process. For example, an exhaust air recovery line may be provided which, remaining within the rotating part of the stretch-blowing machine, distributes it through annular tanks onto the blowing valves. Alternatively or additionally, the recovery of the exhaust air can take place through the blowing circuit itself, by opening one of the valves so that the air flows in the opposite direction to that in which it had been injected.

Such solutions cannot be used in an aseptic forming process. In fact, as it has already transited in the container, the air thus recovered may have a higher bacterial load and, introducing it back into the controlled atmosphere environment under the isolator could cause cross contamination, bringing with it dust, dirt and other undesired agents.

In this context, the technical task underpinning the present invention is to provide a forming apparatus and process for forming containers starting from parisons made of a thermoplastic material, and a related process, which obviate the drawbacks of the prior art mentioned above.

In particular, an aim of the present invention is to provide an aseptic apparatus and process for forming containers starting from parisons made of a thermoplastic material, which enable the exhaust air to be recovered within the process.

The defined technical task and the specified aims are substantially achieved by an aseptic forming apparatus for forming containers starting from parisons made of a thermoplastic material, comprising:
  at least one forming station comprising a forming mould defining a housing cavity for a parison and a blowing nozzle applicable at a mouth of the parison;
  a feeding circuit for feeding sterile compressed air, comprising at least one feeding line of sterile compressed air to said blowing nozzle and at least one first recovery line of exhaust compressed air selectively communicating with said at least one feeding line of sterile compressed air,
  characterized in that it comprises at least one sterile filter arranged along said feeding circuit for feeding sterile compressed air.

Preferably, various sterile filters are arranged in series along said feeding circuit for feeding compressed air.

In accordance with one embodiment, said at least one sterile filter is arranged on the feeding line of sterile compressed air.

The first recovery line of exhaust compressed air is connected to the feeding line of sterile compressed air in a first predefined point upstream of the sterile filter.

In accordance with one embodiment, the forming apparatus comprises:
  a fixed base;
  a rotating carousel on which the forming station is arranged;
  at least one rotary joint on the feeding line of sterile compressed air.

The rotary joint establishes a connection between the rotating carousel and the fixed base. The sterile filter is arranged upstream of the rotary joint.

In accordance with one embodiment, the feeding circuit of compressed air comprises at least one first feeding line of sterile compressed air having maximum pressure of 40 bar and a second feeding line of sterile compressed air having maximum pressure of 15 bar. The first recovery line of exhaust compressed air is connected to the second feeding line of sterile compressed air.

In accordance with one embodiment, said at least one sterile filter is arranged on the first recovery line of exhaust compressed air. The first recovery line of exhaust compressed air is connected to the feeding line of sterile compressed air in a second predefined point downstream of the sterile filter.

In accordance with one embodiment, the forming apparatus comprises:
- a fixed base;
- a rotating carousel on which the forming station is arranged;
- at least one rotary joint on the feeding line of sterile compressed air.

The rotary joint establishes a connection between the rotating carousel and the fixed base. The second predefined point is downstream of the rotary joint.

In accordance with one embodiment, the feeding circuit of compressed air comprises at least one first feeding line of sterile compressed air having maximum pressure of 40 bar and a second feeding line of sterile compressed air having maximum pressure of 15 bar.

The first recovery line of exhaust compressed air is connected to the second feeding line of sterile compressed air.

In accordance with one embodiment, the feeding circuit of sterile compressed air further comprises:
- a third feeding line of compressed air at intermediate pressure between the first feeding line of compressed air and the second feeding line;
- a second recovery line of exhaust compressed air selectively communicating with the third feeding line.

A further sterile filter is arranged along the second recovery line.

In accordance with one embodiment, the forming apparatus comprises a first valve means configured to establish selective communication between the sterile feeding lines of compressed air and the blowing nozzle.

In accordance with one embodiment, the forming apparatus further comprises a second valve means configured to establish selective communication between one of the recovery lines and the corresponding feeding line.

In accordance with one embodiment, the forming apparatus comprises at least one inlet for a sterilizing substance. Such inlet is selectively communicating with said at least one feeding line of sterile compressed air.

The specific technical task and the specified aims are substantially attained by a process for aseptically forming containers starting from parisons made of a thermoplastic material, comprising the steps of:
- injecting sterile compressed air inside a parison arranged in a stretch-blowing forming mould so as to obtain a container;
- evacuating the exhaust compressed air from the formed container, characterised in that it comprises the steps of:
- making at least a part of the exhaust compressed air evacuated from the formed container passing through a sterile filter so as to obtain recovery sterile air;
- injecting the recovery sterile air in another parison arranged in another forming mould.

According to an aspect of the invention, the sterile compressed air has a maximum pressure of 40 bar whereas the sterile recovery air has a maximum pressure of 20 bar.

Figure 2:
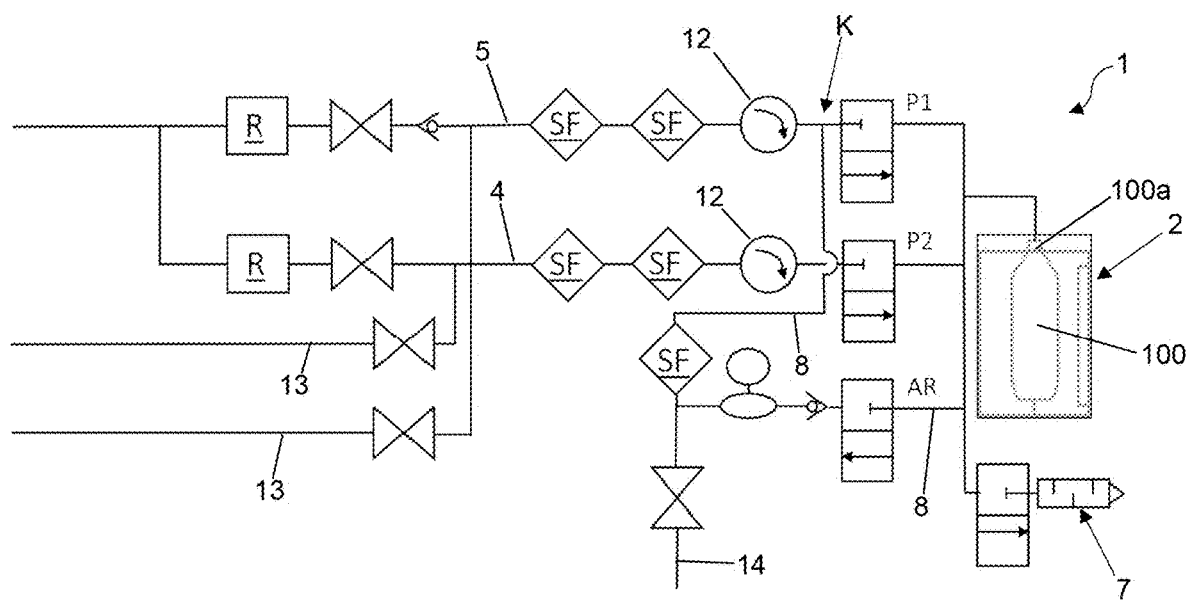
Figure 3:
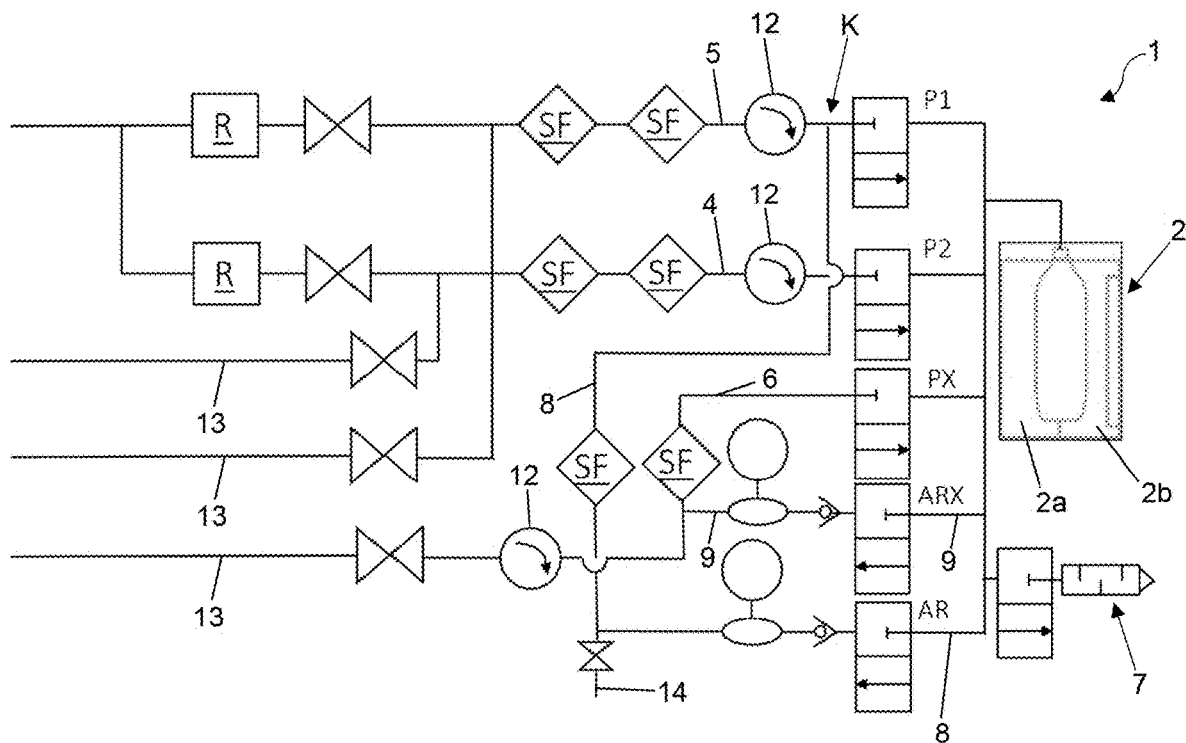

Further characteristics and advantages of the present invention will appear more clearly from the indicative and therefore non-limiting description of a preferred but not exclusive embodiment of a forming apparatus and process for aseptically forming containers starting from parisons made of thermoplastic material, as illustrated in the appended drawings, in which:

FIG. 1 schematically illustrates a first embodiment of a circuit of sterile compressed air of a forming apparatus for aseptically forming containers starting from parisons made of thermoplastic material;

FIG. 2 schematically illustrates a second embodiment of a circuit of sterile compressed air of a forming apparatus for aseptically forming containers starting from parisons made of thermoplastic material; and FIG. 3 schematically illustrates a third embodiment of a circuit of sterile compressed air of a forming apparatus for aseptically forming containers starting from parisons made of thermoplastic material.

With reference to the figures, the number 1 indicates a forming station of a forming apparatus aseptically forming a container 100 starting from a parison made of thermoplastic material.

In the forming station 1 there is a stretch-blowing forming mould 2 in which the parison is housed to be formed into a container 100.

The forming mould 2 comprises a first half-mould 2a and a second half-mould 2b that can be approached to define at least a housing cavity for housing a parison.

The forming mould 2 preferably also comprises a bottom (not illustrated) which cooperates with the half-moulds 2a, 2b in order to form the bottom of the container 100.

In the forming station 1 there is a blowing nozzle (not illustrated) applicable to a mouth 100a of the parison. In the sector, the blowing nozzle is also known as a "seal".

Sterile compressed air is injected through the blowing nozzle in the parison.

The sterile compressed air can have different pressures during the parison forming steps and it is supplied by a feeding circuit.

In particular, in the embodiments described and illustrated herein, the compressed air may have:
- maximum pressure of 15 bar, during a first "pre-blowing" step;
- maximum pressure of 20 bar, during a second "pre-blowing" or medium pressure blowing step;
- maximum pressure of 40 bar, during a "blowing" step.

In this context, the compressed air having a maximum pressure equal to 40 bar (also known as "high pressure air") comes from a first feeding line 4, the compressed air having maximum pressure equal to 15 bar (also known as "low pressure air") comes from a second feeding line 5.

In one embodiment, illustrated in FIG. 3, there are three feeding lines of compressed air instead of two. In particular, the compressed air having a maximum pressure equal to 20 bar (also known as "medium pressure air") comes from a third feeding line 6.

The stretching of the parison during the injection of compressed air takes place by means of a stretching rod having an extension along a direction parallel to an axis of the forming mould 2. Preferably, the extension direction of the stretching rod coincides with the axis of the forming mould 2.

The stretching rod is slidably assembled within the blowing nozzle so as to be able to penetrate into the parison through the mouth 100*a*.

The feeding circuit of sterile compressed air comprises a first valve means P1, P2, PX configured to establish a selective communication between the two or more feeding lines of sterile compressed air 4, 5, 6 and the blowing nozzle.

In the embodiment described and illustrated herein, the first valve means P1, P2, PX comprise a blowing valve P1, P2, PX for each feeding line 4, 5, 6. Each blowing valve P1, P2, PX can be configured at least in:

an open position, in which it enables the passage of sterile compressed air towards the blowing nozzle, and a closed position, in which it interrupts the passage of sterile compressed air towards the blowing nozzle.

Preferably, along at least the first and the second feeding line of sterile compressed air 4, 5 a pressure regulator R is arranged for compressing the air at the corresponding pressure (low pressure or high pressure).

The exhaust compressed air is evacuated through the blowing nozzle. At least a part of the exhaust compressed air evacuated from the container 100 formed is recovered in order to be re-introduced into circulation along one of the feeding lines of sterile compressed air in particular along the second feeding line 5 (low pressure). The remaining part is discharged into the atmosphere through a vent valve 7.

The feeding circuit of sterile compressed air comprises at least a first recovery line 8 of the exhaust compressed air. The first recovery line 8 communicates selectively with at least one of the feeding lines of sterile compressed air, preferably with the second feeding line 5 (low pressure).

In accordance with an aspect of the invention, the first recovery line 8 is selectively connected with the second feeding line 5 (low pressure) so that part of the exhaust compressed air recovered in the blowing step, which has a lower pressure than the blowing pressure, is reused during a first "pre-blowing" step.

Originally, at least one sterile filter SF is arranged along the feeding circuit for feeding compressed air. In this way, it is possible to make the exhaust compressed air that is re-introduced into circulation sterile again.

In this context, a sterile filter means a filter that can remove almost all of the particles dispersed in the air.

For example, a sterile filter has the following properties:
it has a high retention rate, i.e. greater than 99.99998% in relation to 0.2 μm particles and greater than 99.9999998% in relation to 0.02 μm particles;
it has a very high retention rate for viruses and bacteriophages, i.e. $LRV>7/cm^2$;
it can be sterilized, i.e. it can be sterilized with a sterilizing agent (e.g. hydrogen peroxide) before starting to produce containers.

According to an aspect of the invention, various sterile filters SF are arranged in a series redundant configuration along the feeding circuit of sterile compressed air.

According to one embodiment, the sterile filter SF is arranged on the second feeding line of sterile compressed air 5 and the first recovery line of exhaust compressed air 8 is connected to the second feeding line 5 upstream of the sterile filter SF.

As the connection of the first recovery line 8 is upstream of the sterile filter SF which is already present along the second feeding line 5, it is not necessary to add other filters.

Such embodiment is shown, for example, in FIG. 1. In such figure, the presence of two sterile filters SF can be noted both along the first feeding line 4 and along the second feeding line 5 of sterile compressed air. The first recovery line 8 of exhaust compressed air is connected to the second feeding line 5 of sterile compressed air (low pressure) upstream of the two sterile filters SF of such line.

In this way, the exhaust air (potentially dirty) is made sterile again and suitable for aseptic forming, in particular for use in the first "pre-blowing" step.

Preferably, the forming apparatus comprises an auxiliary line 15 that receives part of the air recovered from the first recovery line 8 for feeding pneumatic cylinders used 16 in the forming station 1.

According to another embodiment, the sterile filter SF is arranged on the first recovery line of exhaust compressed air 8. Such embodiment is shown, for example, in FIG. 2. In such figure, the presence of two sterile filters SF can be noted both along the first feeding line 4 and along the second feeding line 5 of sterile compressed air. The first recovery line 8 of exhaust compressed air is connected to the second feeding line 5 of sterile compressed air (low pressure) downstream of the two sterile filters SF present on the latter line. On the second feeding line 5 of sterile compressed air two sterile filters SF are illustrated, but there may only be one of them.

According to another embodiment, the feeding circuit of compressed air comprises a second recovery line 9 of exhaust compressed air selectively communicating with the third feeding line 6.

A sterile filter SF is arranged also along the second recovery line 9.

In this embodiment, illustrated in FIG. 3, the second recovery line 9 is arranged to recover the exhaust air from the blowing step, which is reused during a second pre-blowing step (at medium pressure).

The first recovery line 8 is instead appointed to recover the blowing air that is sent to the second feeding line 5 in order to be used during a first pre-blowing step.

The feeding circuit of sterile compressed air further comprises a second valve means AR, ARX configured to establish a selective communication between one of the recovery lines 8, 9 and the respective feeding line 5, 6. The second valve means comprises at least a first recovery valve AR configured to establish a selective communication between the first recovery line 8 and the second feeding line 5 (low pressure).

In the embodiment of FIG. 3, the second valve means also comprises a second recovery valve ARX configured to establish a selective communication between the second recovery line 9 and the third feeding line 6 (medium pressure).

Each recovery valve AR, ARX can be configured at least in:

an open position, in which it enables the passage of exhaust air towards the respective feeding line 5, 6, and a closed position, in which it interrupts the passage of exhaust air towards the feeding line 5, 6.

Preferably, the forming apparatus is of the rotating carousel type. Such forming apparatus comprises a fixed base, a rotating carousel on which various forming stations 2 are arranged and at least a rotary joint which connects the fixed base to the rotating carousel.

In particular, there is a rotary joint provided with various channels 12, one for the first feeding line 4, one for the second feeding line 5 and one for the third feeding line 6 (if provided).

According to one embodiment, the sterile filter SF is arranged on the static part of the forming apparatus (i.e. the fixed base), i.e. upstream of the rotary joint.

In particular, FIG. 1 shows the first recovery line of exhaust compressed air 8 connected to the second feeding line of sterile compressed air 5 in a first predefined point J upstream of the sterile filters SF and of the rotary joint.

In FIG. 1, a further rotary joint is arranged along the first recovery line of exhaust compressed air 8.

In accordance with another embodiment, the sterile filter SF is arranged on the rotating carousel, in particular downstream of the rotary joint.

For example, FIG. 2 shows the first recovery line of exhaust compressed air 8 connected to the second feeding line of sterile compressed air 5 in a second predefined point K downstream of the rotary joint, precisely of the channel 12 of the second feeding line.

In this embodiment, the first recovery line of exhaust compressed air 8 has an extension entirely on the rotating carousel. This enables the forming apparatus to be structurally simplified as no connections are necessary with the static part for the first recovery line 8. Furthermore, such embodiment enables easier maintenance.

The embodiment of FIG. 3 represents an example of "multiple" recovery, i.e. recovery of exhaust blowing air on various distribution lines.

The forming apparatus further comprises at least one inlet 13 for a sterilizing substance. Such inlet 13 is selectively communicating with one of the feeding lines 4, 5, 6 of sterile compressed air.

Preferably, the inlet 13 of the sterilizing agent is arranged upstream of the rotary joint.

In the embodiments described and illustrated herein, there is a sterilizing agent inlet 13 for every feeding line 4, 5, 6 of sterile compressed air.

In the embodiments illustrated in FIGS. 2-3, the forming apparatus comprises an outlet 14 for the sterilizing agent along the first recovery line of exhaust compressed air 8. In fact, as there is at least one sterile filter SF arranged along it, the part of the recovery line 8 comprised between the sterile filter SF and the second predefined point K needs to be sterilized.

The forming apparatus further comprises an isolation device (not illustrated) defining a contamination-controlled environment inside which the forming moulds 2 are arranged.

In practice, the isolation device defines a separate environment from the (dirty) outside environment by means of a physical separation which has the purpose of limiting the inlet of contaminants from the outside environment.

The operation of the forming apparatus for aseptically forming containers starting from parisons made of thermoplastic material is described below. Reference is made to the multiple recovery of FIG. 3, which is the most complete.

The condition is considered in which a first parison is housed inside the forming station 2. The condition is considered in which such first parison has already undergone the first and the second "pre-blowing" step.

Compressed air is fed at high pressure along the first feeding line 4. The corresponding blowing valve P2 is opened for a predefined time to enable sterile air at high pressure to flow towards the blowing nozzle. The sterile air at high pressure is injected in the first parison so as to form a container 100. At the end of the "blowing" step, the exhaust air is discharged through the blowing nozzle. The air discharged from P2 to PX with load losses is reused for blowing at medium pressure.

The second recovery valve ARX opens for a predefined time and at least a part of the exhaust air flows into the second recovery line 9. The air thus recovered passes through the sterile filter SF arranged along the second recovery line 9 and reaches (sterile) the third feeding line 6 of one or more cavities which are in the blowing step.

At this point, the corresponding blowing valve PX opens for a predefined time and the sterile air at medium pressure is injected in another parison being processed for the second "pre-blowing" step (at medium pressure). Inside the blowing cycle, after this step is finished and once the second recovery valve ARX has been closed, the first recovery valve AR is opened to recover the air at lower pressure. Such air is now at low pressure. The first recovery valve AR opens for a predefined time and at least a part of the discharged air flows into the first recovery line 8, passes into the corresponding sterile filter SF and reaches (sterile) the second feeding line 5 (low pressure) of one or more cavities which are in the first "pre-blowing" step.

At this point, the air is made available to another blowing valve P1, which opens for a predefined time and the sterile air at low pressure is sent to another parison being processed for the first "pre-blowing" step. The part of the blowing air that is not recovered is discharged by the blowing nozzle and then disposed of into the atmosphere through the vent valve 7.

It is to be noted that the embodiment of FIG. 3 requires a sterilization step of the second feeding line 5 and of a branch of the first recovery line 8 to be performed.

In particular, the air discharged and recovered is sent to the feeding line 5, 6 without being accumulated. In other words, the air discharged and recovered is used in the same blowing cycle without waiting in accumulation systems, such as for example a tank.

From the above description the characteristics of an apparatus and process for aseptically forming containers starting from parisons made of a thermoplastic material, according to the present invention, will be clear, as will the resultant advantages thereof.

In particular, it is possible to use part of the exhaust air from blowing thanks to the provision of at least one sterile filter along the circuit of sterile compressed air to be injected into the parisons.

In this way, also in aseptic forming, it is possible to recover part of the exhaust air not only for other functions of the system, but directly for pre-blowing.

The invention claimed is:

1. Process for aseptically forming containers (100) starting from parisons in plastic material, comprising the steps of:
    injecting sterile compressed air inside a parison arranged in a stretch-blowing forming mould (2) so as to obtain a container (100);
    evacuating the exhaust compressed air from the formed container (100),
    characterized in that it comprises the steps of:
    making at least a part of the exhaust compressed air evacuated from the formed container (100) passing through a sterile filter (SF) so as to obtain recovery sterile air;
    injecting the recovery sterile air in another parison arranged in another forming mould (2), said recovery sterile air being injected without being accumulated.

2. Process according to claim 1, wherein the sterile compressed air has a maximum pressure of 40 bar, whereas the recovery sterile air has a maximum pressure of 20 bar.

3. Forming apparatus for aseptically forming containers (100) starting with parisons in thermoplastic material, comprising:

at least one forming station (1) comprising a forming mould (2) defining a housing cavity for a parison and a blowing nozzle applicable at a mouth (100*a*) of the parison;

a feeding circuit for feeding sterile compressed air, comprising at least one feeding line (5) of sterile compressed air to said blowing nozzle and at least one first recovery line (8) of exhaust compressed air selectively communicating with said at least one feeding line (5) of compressed air, characterized in that it comprises at least one sterile filter (SF) arranged along said feeding circuit for feeding compressed air.

4. Forming apparatus according to claim 3, comprising a plurality of sterile filters (SF) arranged in series along said feeding circuit for feeding compressed air.

5. Forming apparatus according to claim 3, wherein said at least one sterile filter (SF) is arranged on the feeding line (5) of sterile compressed air, the first recovery line (8) of exhaust compressed air being connected to the feeding line (5) of sterile compressed air in a first predefined point (J) upstream of the sterile filter (SF).

6. Forming apparatus according to claim 5, comprising:
a fixed base;
a rotating carousel on which the forming station (1) is arranged;
at least one rotary joint on the feeding line (5) of sterile compressed air, said at least one rotary joint establishing a connection between the rotating carousel and the fixed base,
said at least one sterile filter (SF) being arranged upstream of said at least one rotary joint.

7. Forming apparatus according to claim 5, wherein the feeding circuit for feeding sterile compressed air comprises a first feeding line (4) of sterile compressed air having a maximum pressure of 40 bar and a second feeding line (5) of sterile compressed line having a maximum pressure of 15 bar, said first recovery line (8) of exhaust compressed air being connected to the second feeding line (5) of sterile compressed air.

8. Forming apparatus according to claim 3, wherein said at least one sterile filter (SF) is arranged on the first recovery line (8) of exhaust compressed air, said at least one first recovery line (8) of exhaust compressed air being connected to the feeding line (5) of sterile compressed air in a second predefined point (K) downstream the sterile filter (SF).

9. Forming apparatus according to claim 8, comprising:
a fixed base;
a rotating carousel on which the forming station (1) is arranged;
at least a rotary joint on the feeding line (5) of sterile compressed air, said at least a rotary joint establishing a connection between the rotating carousel and the fixed base,
said second predefined point (K) being downstream said at least a rotary joint.

10. Forming apparatus according to claim 8, wherein the feeding circuit for feeding sterile compressed air comprising a first feeding line (4) of sterile compressed air having a maximum pressure of 40 bar and a second feeding line (5) of sterile compressed line having a maximum pressure of 15 bar, said first recovery line (8) of exhaust compressed air being connected to the second feeding line (5) of sterile compressed air.

11. Forming apparatus according to claim 8, wherein the feeding circuit for feeding sterile compressed air further comprises:
a third feeding line (6) of sterile compressed air having an intermediate pressure between that of the first feeding line (4) and that of the second feeding line (5);
a second recovery line (9) of exhaust compressed air selectively communicating with said third feeding line (6), along said second recovery line (9) being arranged an additional sterile filter (SF).

12. Forming apparatus according to claim 7, comprising first valve means (P1, P2, PX) configured to establish a selective communication between the feeding lines (4, 5, 6) of sterile compressed air and the blowing nozzle.

13. Apparatus according to claim 12, further comprising second valve means (AR, ARX) configured to establish a selective communication between one of the recovery lines (8; 9) and the corresponding feeding line (5, 6).

14. Apparatus according to claim 3, comprising at least one inlet (13) for a sterilizing substance, said at least one inlet (13) selectively communicating with said at least one feeding line (5) of sterile compressed air.

\* \* \* \* \*